US012630567B2

(12) United States Patent
Abney et al.

(10) Patent No.: US 12,630,567 B2
(45) Date of Patent: May 19, 2026

(54) HIGH YIELD SYNTHESIS OF METAL-ORGANIC FRAMEWORKS

(71) Applicant: ExxonMobil Technology and Engineering Company, Annandale, NJ (US)

(72) Inventors: Carter W. Abney, Athens, WI (US); Anna C. Ivashko, Denville, NJ (US); Gerardo J. Majano, Basking Ridge, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 651 days.

(21) Appl. No.: 17/907,663

(22) PCT Filed: Feb. 16, 2021

(86) PCT No.: PCT/US2021/018248

§ 371 (c)(1),
(2) Date: Sep. 28, 2022

(87) PCT Pub. No.: WO2021/216174

PCT Pub. Date: Oct. 28, 2021

(65) Prior Publication Data

US 2023/0151028 A1 May 18, 2023

Related U.S. Application Data

(60) Provisional application No. 63/014,309, filed on Apr. 23, 2020.

(51) Int. Cl.
*C07F 3/02* (2006.01)
*C07F 13/00* (2006.01)
*C07F 19/00* (2006.01)

(52) U.S. Cl.
CPC .............. *C07F 3/02* (2013.01); *C07F 13/005* (2013.01)

(58) Field of Classification Search
CPC . C07F 3/02; C07F 13/005; C07F 13/00; B01J 20/226
See application file for complete search history.

(56) References Cited

U.S. PATENT DOCUMENTS

| | | | | |
|---|---|---|---|---|
| 8,653,292 | B2 | 2/2014 | Hafizovic et al. | 556/55 |
| 2007/0202038 | A1 | 8/2007 | Yaghi et al. | 423/702 |
| 2010/0307336 | A1 | 12/2010 | Ni et al. | 95/127 |
| 2016/0031920 | A1 | 2/2016 | Nandi et al. | |
| 2021/0053903 | A1 | 2/2021 | Abney et al. | |
| 2022/0176343 | A1* | 6/2022 | Weston | B01D 53/02 |
| 2024/0001335 | A1* | 1/2024 | Ivashko | B01J 20/226 |
| 2024/0002417 | A1* | 1/2024 | Ivashko | C07F 13/005 |

FOREIGN PATENT DOCUMENTS

| | | | |
|---|---|---|---|
| EP | 1928831 | 5/2012 | C07D 213/79 |

OTHER PUBLICATIONS

H. He, et al, 57 Angewandte Chemie International Edition, 4657-4662 (2018) (Year: 2018).*
Q. Xia et al., 15 Nano Micro Small, 1-25 (Jan. 2019) (Year: 2019).*
M. Van Vleet, 118 Chemical Reviews, 3681-3721 (2018) (Year: 2018).*
Z. Yin et al., 378 Coordination Chemistry Reviews, 500-512 (2019) (Year: 2019).*
A. K. Das, et al, 6(1) Scientific Reports, 28050 (2016) (Year: 2016).*
Of D. Gygi, et al, 28.4 Chemistry of Materials 1128-1138 (2016) (Year: 2016).*
Q.Yu, et al, 253 Anal. Biochem, 50-56,(1997) (Year: 1997).*
S. Leubner, et al, 26(17) Chemistry—A European Journal, 3877-3883 (2020) (Year: 2020).*
L. Maserati, et al, 28 Chemistry of Materials, 1581-1588 (2016)("Maserati") (Year: 2016).*
F. Baker, et al., Chapter 5, Some Fundamentals of Chemistry, in Introduction to medical laboratory technology, 77-111 (5th ed., Butterworth-Heinemann, 1976) (Year: 1976).*
E. Urbansky et al., 77 Journal of Chemical Education, 1640-1644 (2000) (Year: 2000).*
M. Ahamad et al., 49 Dalton Transactions, 14690-14705 (2020) (Year: 2020).*
Good, N. et al. (1966) "Hydrogen Ion Buffers for Biological Research," *Biochemistry,* v.5(2), pp. 467-477.
Kandegedara, A. et al. (1999) "Noncomplexing Tertiary Amines as "Better" Buffers Covering the Range of pH 3-11. Temperature Dependence of Their Acid Dissociation Constants," *Anal. Chem.,* v.71(15), pp. 3140-3144.
Lindsey, A. S. et al. (1957) "The Kolbe-Schmitt Reaction," *Chem. Rev.,* v.57(4), pp. 583-620.
Long, J., Siegelman, R. et al. (2017) "Controlling Cooperative $CO_2$ Adsorption in Diamine- Appended Mg2(dobpdc) Metal-Organic Frameworks," *J. Am. Chem. Soc,* v.139(30), pp. 10526-10538.
McDonald, T. et al. (2012) "Capture of Carbon Dioxide from Air and Flue Gas in the Alkylamine-Appended Metal-Organic Framework mmen-Mg2(dobpdc)," *J. Am. Chem. Soc.,* v.134(16), pp. 7056-7065.

(Continued)

*Primary Examiner* — Alexander R Pagano
*Assistant Examiner* — Frank S. Hou
(74) *Attorney, Agent, or Firm* — Shook, Hardy & Bacon L.L.P.

(57) ABSTRACT

Metal-organic frameworks are synthesized from either a high concentration synthesis where reaction solutions comprising increased reagent concentrations, or suspensions of reagents which exceed their solubility limit in the reaction solution in a high solids synthesis. In both approaches, the solubility of reagent is maximized by inclusion of a buffer, fixing a nominal pH of the reaction solution to allow metal-organic framework formation. These methods improve yields and scale up of metal-organic frameworks.

12 Claims, 4 Drawing Sheets

(56) References Cited

OTHER PUBLICATIONS

McDonald, T. et al. (2015) "Cooperative insertion of $CO_2$ in diamine-appended metal-organic frameworks," *Nature,* v.519(7543), pp. 303-308.
Milner, Phillip J. et al. (2018) "Overcoming Double-Step $CO_2$ Adsorption and Minimizing Water Co-Adsorption in Bulky Diamine-Appended Variants of $Mg_2$(dobpdc)," *Chem. Sci.,* v.9(1), pp. 160-174.
Schoedel, A et al. (2016) "Structures of Metal-Organic Frameworks with Rod Secondary Building Units," *Chem Rev.,* v.116(19), pp. 12466-12535.
Stock, N. et al. (2012) "Synthesis of Metal-Organic Frameworks (MOFs): Routes to Various MOF Topologies, Morphologies, and Composites" *Chem Rev,* 112, pp. 933-939.

* cited by examiner

HIGH YIELD SYNTHESIS OF METAL-ORGANIC FRAMEWORKS

CROSS REFERENCE TO RELATED APPLICATIONS

This application is a national stage filing of Patent Cooperation Treaty Application No. PCT/US2021/018248 filed Feb. 16, 2021 claiming priority to U.S. Provisional Application No. 63/014,309, filed Apr. 23, 2020.

FIELD OF THE INVENTION

The present invention relates to methods of synthesizing metal-organic frameworks.

BACKGROUND OF THE INVENTION

Traditional synthesis for making metal-organic frameworks involve complete dissolution of solids in solvent forming a reaction solution that then enhances metal-organic framework growth at elevated temperatures. Often the prerequisite of such synthesis is a large volume of solvent required for reagent dissolution. For crystal growth, however, the amount of the solid reagents needed to make the metal-organic framework is often the limiting factor.

Traditional synthetic protocols have two major drawbacks: long reaction time and low yield. While yields obtained using traditional solvothermal methods are reasonable for laboratory use, the methods are inefficient on an industrial scale in terms of time, separation of solvents, and heating. Optimization and scale-up of metal-organic framework syntheses are particularly challenging due to the nature of the materials as they often require large amounts of solvents and can accommodate small amounts of solids. This naturally results in poor yields of materials and extremely intensive processes in order to produce enough material for testing.

A need exists, therefore, for synthesis of metal organic frameworks that produce higher yields of metal-organic frameworks with reduced labor than that typically required to obtain high quality metal-organic frameworks.

SUMMARY OF THE INVENTION

Methods of making metal-organic frameworks comprising the steps of dissolving a plurality of solid reagents and a buffer in a solvent to provide a synthesis solution and adding an amount of the plurality of solid reagents to the synthesis solution to produce a reaction solution causing linker deprotonation and formation of the metal-organic frameworks. The solid reagents comprise at least one metal salt and at least one linker. The reaction solution has a reagent concentration between about 3 times to about 7 times of a traditional solvothermal synthesis reagent concentration.

Also provided are methods of making metal-organic frameworks comprising the steps of mixing an amount of a plurality of solid reagents and a buffer in a solvent to provide a reaction mixture. The solid reagents comprise at least one metal salt and at least one linker and the amount of the plurality of the solid reagents exceeds an amount that can be dissolved in the solvent. The reaction mixture is a saturated suspension and causes linker deprotonation and formation of the metal-organic frameworks. In an aspect, the method further comprises the step of increasing the amount of the solid reagents until the solid reagents are no longer soluble in the solvent.

Further provided are methods of synthesizing metal-organic frameworks comprising the steps of mixing reagents comprising one or more metal salts and one or more linkers with a buffer in a solvent to produce a reaction mixture that is a saturated suspension. The reaction mixture is heated to form the metal-organic frameworks in an increased amount in volume-normalized, mass-based yield between about 3 times to about 45 times when compared with a traditional solvothermal synthesis of the same reagents.

Also provided are methods of synthesizing metal organic-frameworks comprising the steps of dissolving a plurality of solid reagents and a buffer in a solvent to provide a synthesis solution, and adding an amount of the plurality of solid reagents to the synthesis solution to produce a reaction solution having an amount of reagent concentration between about 3 to about 7 times compared to an amount of reagent concentration in a traditional solvothermal synthesis. The solid reagents comprise at least one metal salt and at least one linker. The reaction solution causes linker deprotonation and formation of the metal-organic frameworks between about 3 times to about 15 times in volume-normalized, mass-based yield in comparison with metal-organic frameworks yields by traditional solvothermal synthesis of the same reagents.

In an aspect, the reaction solution or the reaction mixture is static for about 96 hours.

In an aspect, the reaction solution or the reaction mixture is stirred, tumbled, shaken, mixed or otherwise agitated for about 24 hours at room temperature or between about 18° C. to about 22° C., or at temperatures higher than room temperature.

In an aspect, the buffer comprises a Brønsted acid and its conjugate base, or a Brønsted base and its conjugate acid. In an aspect, the reaction solution or the reaction mixture is heated between about 25° C., and about 160° C.

In an aspect, the reaction solution is subject to autogenous pressurization. In an aspect, the linker comprises multiple bridged aryl species having two or more phenyl rings or two phenyl rings joined by a vinyl group or an alkynyl group. In an aspect, the linker is $H_4$DOBDPC. In an aspect, the metal salts are prepared by neutralization of acids or bases of a metal ion. In an aspect, the metal salts are $Mg(NO_3)_2 \cdot 6H_2O$ and $MnCl_2 \cdot 4H_2O$. In an aspect, the buffer is Na MOPS. In an aspect, the metal-organic frameworks comprise metal ions of one more distinct elements and a plurality of organic linkers, wherein each organic linker is connected to one of the metal ions of two or more distinct elements. In an aspect, the metal-organic framework is MOF-274. In an aspect, nominal pH of the reaction solution allows for linker deprotonation. In an aspect, the solvent comprises water, acetonitrile, and tetrahydrofuran. In an aspect, the solvent is selected by evaluation of Hansen solubility parameters. In an aspect, the reaction solution is heated in static conditions. In an aspect, the reaction solution is heated at about 120° C. In an aspect, the metal-organic framework has an $N_2$ absorption between about 25 mmol/g and about 40 mmol/g at relative pressure between about 0.1 and about 0.9. In an aspect, the metal-organic framework produces powder x-ray diffraction peaks at 2θ values between about 4° and about 6° and between about 7° and about 9°. In an aspect, the metal-organic frameworks produce powder x-ray diffraction peaks at 2θ values which are about equal to metal-organic frameworks made by a traditional synthesis.

In an aspect, the metal-organic frameworks provide an X-ray diffraction pattern having a unit cell that can be indexed to a hexagonal unit cell. In an aspect, the unit cell is selected from spacegroups 168 to 194 as defined in the *International Tables for Crystallography*. In an aspect, the present metal organic frameworks further comprise a metal rod structure composed of face-sharing octahedral, described by the Lidin-Andersson helix, as identified by Schoedel, Li, Li, O'Keeffe, and Yaghi, *Chem Rev.* 2016 116, 12466-12535. In an aspect, the metal organic framework has a hexagonal pore oriented parallel to the metal rod structure. In an aspect, the present metal organic frameworks display a (3,5,7)-c msi net, according to the approach described by Schoedel, Li, Li, O'Keeffe, and Yaghi, *Chem Rev.* 2016 116, 12466-12535. In an aspect, The metal organic framework displays a (3,5,7)-c msg net, according to the approach described by Schoedel, Li, Li, O'Keeffe, and Yaghi, *Chem Rev.* 2016 116, 12466-12535.

In an aspect, the subject metal organic frameworks express peak maxima in the X-ray diffraction pattern at 30° C. after drying at 250° C. under $N_2$ for 30 minutes at:

| d(Å) |
|---|
| 18.65 ± 0.5 |
| 10.79 ± 0.5 |
| 9.35 ± 0.5 |
| 7.07 ± 0.5 |
| 6.51 ± 0.5 |
| 6.24 ± 0.5 |
| 5.84 ± 0.5 |
| 5.41 ± 0.5 |
| 5.19 ± 0.5 |

In an aspect, the express peak maxima in the X-ray diffraction pattern at 30° C. after drying at 250° C. under $N_2$ for 30 minutes at:

| d(Å) |
|---|
| 18.65 ± 0.5 |
| 10.79 ± 0.5 |
| 7.07 ± 0.5 |
| 5.41 ± 0.5 |
| 5.19 ± 0.5 |

In an aspect, an A axis of the unit cell and a B axis of the unit cell are each greater than 18 Å, and a c axis is greater than 6 Å.

DESCRIPTION OF THE PREFERRED EMBODIMENTS

Figure 1:
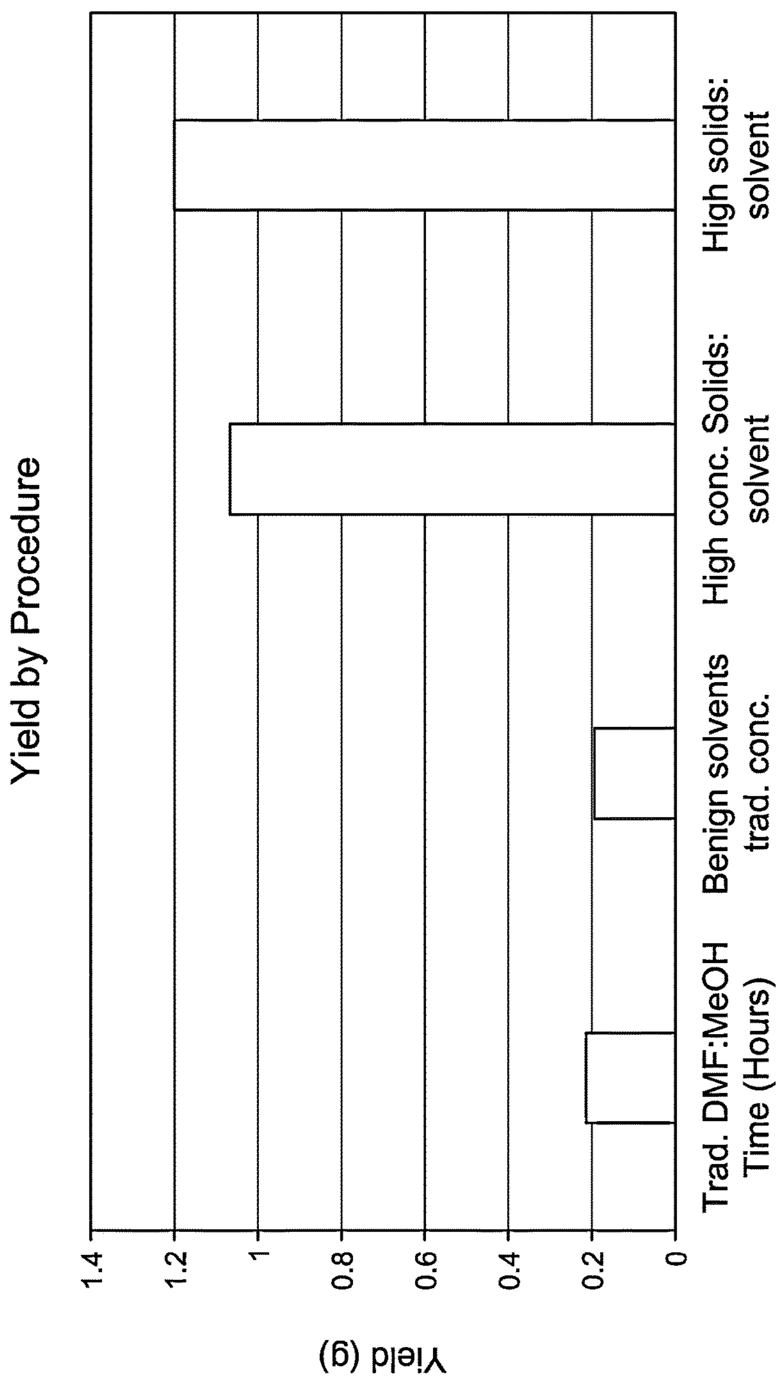
FIG. 1 is a chart that displays yield increase of Mg/Mn-MOF-274 as amount of reagents in the starting mixture is increased.

As described herein, metal-organic frameworks are synthesized from either (1) reaction solutions comprising increased reagent concentrations, referred to herein as a "high concentration synthesis," or (2) suspensions of reagents which exceed their solubility limit in the reaction solvent referred to herein as a "high solids synthesis". In both approaches, the solubility of reagent is maximized by inclusion of a chemical buffer ("buffer"), fixing a nominal pH of the reaction solution to allow linker deprotonation and subsequent metal-organic framework formation. These methodologies can improve the yield and scale up of metal-organic framework ("MOF") materials. Typically, a traditional synthesis for making metal-organic frameworks afford poor yields of final product and therefore are challenging materials for scale up, intensification, and commercialization. Here, scale up of making metal-organic framework is intensified by increasing amounts of solid reagents available in relative to the volume of the solvent. It is integral that the quality of metal-organic framework is not sacrificed through the scale-up process. As provided herein, several characterization techniques show that MOF material obtained by intensification process produces the same material with equivalent or better physical properties, such as crystallinity and/or surface area.

Before the present methods and devices are disclosed and described, it is to be understood that unless otherwise indicated this invention is not limited to specific compounds, components, compositions, reactants, reaction conditions, ligands, catalyst structures, metallocene structures, or the like, as such may vary, unless otherwise specified. It is also to be understood that the terminology used herein is for the purpose of describing particular embodiments only and is not intended to be limiting.

For the purposes of this disclosure, the following definitions will apply:

As used herein, the terms "a" and "the" as used herein are understood to encompass the plural as well as the singular.

As used herein, the term "heteroatom" includes oxygen (O), nitrogen (N), sulfur (S) and silicon (Si), boron (B) and phosphorous (P).

The term "aryl" means, unless otherwise stated, a polyunsaturated, aromatic substituent that can be a single ring or multiple rings fused together or linked covalently. In an aspect, the substituent has from 1 to 11 rings, or more specifically, 1 to 3 rings. The term "heteroaryl" refers to aryl substituent groups (or rings) that contain from one to four heteroatoms selected from N, O and S, wherein the nitrogen and sulfur atoms are optionally oxidized, and the nitrogen atom(s) are optionally quaternized. An exemplary heteroaryl group is a six-membered azine, e.g., pyridinyl, diazinyl and triazinyl. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

As used herein, the terms "alkyl," "aryl," and "heteroaryl" can optionally include both substituted and unsubstituted forms of the indicated species. Substituents for the aryl and heteroaryl groups are generically referred to as "aryl group substituents." The substituents are selected from, for example: groups attached to the heteroaryl or heteroarene nucleus through carbon or a heteroatom (e.g., P, N, O, S, Si, or B) including, without limitation, substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R"', —OC(O)R', —C(O)R', —CO.sub.2R', —CONR'R", —OC(O)NR'R", —NR"C(O)R', —NR'—C(O)NR"R"', —NR"C(O).sub.2R', —NR—C(NR'R"R"').dbd.NR"", —NR—C(NR'R")=NR"', —S(O)R', —S(O)R', —S(O)NR'R", —NRSOR', —CN and, —R', —, —CH(Ph), fluoro($C_1$-$C_4$)alkoxy, and fluoro($C_1$-$C_4$)alkyl, in a number ranging from zero to the total number of open valences on the aromatic ring system. Each of the above-named groups is attached to the aryl or heteroaryl nucleus directly or through a heteroatom (e.g., P, N, O, S, Si, or B); and where R', R", R"' and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R"' and R"" groups when more than one of these groups is present.

The term "alkyl," by itself or as part of another substituent, means, unless otherwise stated, a straight or branched chain, or cyclic hydrocarbon radical, or combination thereof, which may be fully saturated, mono- or polyunsaturated and can include di-, tri- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to optionally include those derivatives of alkyl defined in more detail below, such as "heteroalkyl."

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Examples include, but are not limited to, $-CH_2-CH_2-O-CH_3$, $-CH_2-CH_2-NH-CH_3$, $-CH_2-CH_2-N(CH_3)-CH_3$, $-CH_2-S-CH_2-CH_3$, $-CH_2-CH_2$, $-S(O)-CH_3$, $-CH_2-CH_2-S(O)_2-CH_3$, $-CH{=}CH-O-CH_3$, $-Si(CH_3)_3$, $-CH_2-CH{=}N-OCH_3$, and $-CH{=}CH-N(CH_3)-CH_3$. Up to two heteroatoms may be consecutive, such as, for example, $-CH_2-NH-OCH_3$ and $-CH_2-O-Si(CH_3)_3$. Similarly, the term "heteroalkylene" by itself or as part of another substituent means a divalent radical derived from heteroalkyl, as exemplified, but not limited by, $-CH_2-CH_2-S-CH_2-CH_2-$ and $-CH_2-S-CH_2-CH_2-NH-CH_2-$. For heteroalkylene groups, heteroatoms can also occupy either or both chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula $-CO_2R'-$ represents both —C(O)OR' and —OC(O)R'.

As used herein, the term "ligand" means a molecule containing one or more substituent groups capable of functioning as a Lewis base (electron donor). In an aspect, the ligand can be oxygen, phosphorus or sulfur. In an aspect, the ligand can be an amine or amines containing 1 to amine groups.

The terms "halo" or "halogen," by themselves or as part of another substituent, mean, unless otherwise stated, a fluorine, chlorine, bromine, or iodine atom.

The symbol "R" is a general abbreviation that represents a substituent group that is selected from H, substituted or unsubstituted alkyl, substituted or unsubstituted heteroalkyl, substituted or unsubstituted aryl, substituted or unsubstituted heteroaryl, and substituted or unsubstituted heterocycloalkyl groups.

As used herein, the term "Periodic Table" means the Periodic Table of the Elements of the International Union of Pure and Applied Chemistry (IUPAC), dated December 2015.

The term "salt(s)" includes salts of the compounds prepared by the neutralization of acids or bases, depending on the particular ligands or substituents found on the compounds described herein. When compounds of the present invention contain relatively acidic functionalities, base addition salts can be obtained by contacting the neutral form of such compounds with a sufficient amount of the desired base, either neat or in a suitable inert solvent. Examples of base addition salts include sodium, potassium, calcium, ammonium, organic amino, or magnesium salt, or a similar salt. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids, and the like, as well as the salts derived from relatively nontoxic organic acids like acetic, propionic, isobutyric, butyric, maleic, malic, malonic, benzoic, succinic, suberic, fumaric, lactic, mandelic, phthalic, benzenesulfonic, p-tolylsulfonic, citric, tartaric, methanesulfonic, and the like. Certain specific compounds of the present disclosure contain both basic and acidic functionalities that allow the compounds to be converted into either base or acid addition salts. Hydrates of the salts are also included.

It is understood that, in any compound described herein having one or more chiral centers, if an absolute stereochemistry is not expressly indicated, then each center may independently be of R-configuration or S-configuration or a mixture thereof. Thus, the compounds provided herein may be enantiomerically pure or be stereoisomeric mixtures. In addition, it is understood that, in any compound described herein having one or more double bond(s) generating geometrical isomers that can be defined as E or Z, each double bond may independently be E or Z or a mixture thereof. Likewise, it is understood that, in any compound described, all tautomeric forms are also intended to be included.

In addition, the compounds provided herein may also contain unnatural proportions of atomic isotopes at one or more of the atoms that constitute such compounds. For example, the compounds may be radiolabeled with radioactive isotopes, such as for example tritium ($^3H$), iodine-125 ($^{125}I$) or carbon-14 ($^{14}C$). All isotopic variations of the subject compounds, whether radioactive or not, are intended to be encompassed within the scope of present disclosure.

As used herein, a "metal organic framework" can be a mixed-metal organic framework or a metal-organic framework system or a mixed-metal mixed-organic framework system as described in U.S. Patent Application No. 62/839,261.

Traditional Synthesis

Traditionally, metal-organic frameworks are prepared by reactions of pre-synthesized or commercially available linkers with metal ions. An alternative approach, referred to as "in situ linker synthesis," specified organic linkers (linkers) can be generated in the reaction media in situ from the starting materials.

In synthesizing the metal-organic framework, organic molecules are not only structure-directing agents but as reactants to be incorporated as part of the framework structure. With this in mind, elevated reaction temperatures are generally employed in conventional synthesis. Solvothermal reaction conditions, structure-directing agents, mineralizers as well as microwave-assisted synthesis or steam-assisted conversions have also been recently introduced.

As referred to herein, the traditional synthesis is typically applied reactions carried out by conventional electric heating without any parallel reactions. In the traditional synthesis, reaction temperature is a primary parameter of a synthesis of the metal-organic framework and two temperature ranges, solvothermal and nonsolvothermal, are normally distinguished, which dictate the kind of reaction setups to be used. Solvothermal reactions generally take place in closed vessels under autogenous pressure about the boiling point of the solvent used. Nonsolvothermal reactions take place below, or at the boiling point under ambient pressure, simplifying synthetic requirements. Nonsolvothermal reactions can be further classified as room-temperature or elevated temperatures.

Traditional synthesis of metal-organic frameworks takes place in a solvent and at temperatures ranging from room temperature to approximately 250° C. Heat is transferred from a hot source, the oven, through convection. Alternatively, energy can be introduced through an electric potential, electromagnetic radiation, mechanical waves (ultrasound), or mechanically. The energy source is closely related to the duration, pressure, and energy per molecule that is introduced into a system, and each of these parameters can have a strong influence on the metal-organic framework formed and its morphology.

Traditional synthesis of metal-organic frameworks is described in McDonald, T., Mason, J., Kong, X. et al, Cooperative insertion of $CO_2$ in diamine-appended metal-organic frameworks, Nature 519, 303-08 (2015), which is incorporated herein by reference. Generally, 0.10 mmol of a linker, 0.25 mmol of metal salts, and 10 mL of a solvent, i.e., methanol/dimethylformamide (DMF) are combined together in a 20 mL glass scintillation vial. The vial is then sealed and placed in a well plate two (2) cm deep on a 393° K hot plate for about 12 hours, after which a powder forms on the bottom and walls of the vial. The metal-organic framework material is then decanted and the remaining powder soaked three times in DMF and then three times in methanol. The metal-organic frameworks are then collected by filtration and fully desolvated by heating under dynamic vacuum (<10 μbar) at 523° K for 24 hours. Using this specific methodology, the traditional synthesis method yields about 0.073 mmol of metal-organic frameworks, or 73% yield (comparing mmol of the metal-organic frameworks produced to initial mmol of linker) or a volume-normalized mass-based yield of 2.7 grams MOF per liter of reaction solution.

In addition to the traditional synthesis described in Nature, 2015, 519, 303-308, incorporated herein by reference, synthesis of making metal-organic frameworks are further described in: J. Am. Chem. Soc. 2012, 134, 7056-7065; Chem. Sci, 2018, 9, 160-174; U.S. Pat. No. 8,653,292 and US Patent Appl. Pub. Nos. 2007/0202038, 2010/0307336, and 2016/0031920.

Present Methods of Making Metal Organic Frameworks

Provided herein are methods of making metal organic frameworks where either a high concentration of solid reagents is combined to provide a reaction solution having an amount of a reagent concentration that is between about three (3) to about seven (7) greater than that used in a traditional solvothermal synthesis, and/or the reaction mixture is saturated with solid reagents and/or is a suspension. Under either method, the metal-organic framework is formed. As used herein, the term "solid reagents" refers to a combination of one or more metal salts and one or more organic linkers ("linkers"). In an aspect, the organic linker includes multiple bridged aryl species such as molecules having two or more phenyl rings or two phenyl rings joined by a vinyl or alkynyl group.

In the high concentration synthesis, solubility of the solid reagents in a synthesis solution is increased through inclusion of higher buffer concentrations resulting in improved yields. More specifically, in the synthesis solution, metal salts, one or more linkers and a buffer are dissolved in the solvent to provide a synthesis solution having a reagent concentration. Additional solid reagents (the metal salts and the linker(s)) are then added to the synthesis solution increasing the reagent concentration and providing a reaction solution. As provided herein, applying this methodology can result in a fifteen (15) fold increase in a volume-normalized, mass-based yield for synthesis of MOF-274 when compared to approaches articulated in Nature, 2015, 519, 303-308.

In the high solids synthesis, the reagent solids are well dispersed but are not fully dissolved in the reaction mixture. More specifically, the amounts of solid reagents (melt salts and linkers) exceed that which can be dissolved so that the reaction solution is saturated. In this methodology, the amount of the solid reagents is increased until the solid reagents are no longer soluble in the reaction solution and a suspension is formed.

In both the high concentration synthesis and the high solid synthesis, reagent concentrations can be increased up to seven-fold when compared with the traditional synthesis (Nature, 2015, 519, 303-308) resulting in mass yields ("yields") increased up to about 35 times the amount when normalized by the volume of solvent used in the synthesis. Further, both approaches increase the quantity of MOF prepared (yields) while simultaneously maintaining or reducing the volume of solvent and reactor size, allowing for potential scale up applications.

In an aspect, the high concentration synthesis includes methods of making metal-organic frameworks comprising the steps of combining one or more metal salt(s), and one or more linkers in a buffer and dissolving the solid reagents in a solvent to provide a synthesis solution. Additional metal salts and linkers are dispersed into the synthesis solution to provide the reaction solution. The reaction solution is then sealed and heated by one of various methods. In an aspect, the cumulative concentration of one or more metal salts are provided in an amount between about 25 mM and about 100 mM and the one or more linkers are provided in an amount between about 10 mM and about 40 mM. In an aspect, the buffer concentration is between about 100 mM and about 260 mM. In an aspect, the reaction solution has a reaction concentration between about 135 mM and about 400 mM of solid reagents. In an aspect, the present methods can have a mass-based, volume-normalized yield between about 2 and about 15 mg of the metal-organic frameworks/mL of the solvent.

In an aspect, in the high solids synthesis, the solid reagents can have a concentration between about 5 and about 35 times greater than the concentration of the solid reagents in the traditional synthesis. In an aspect, the one or more metal salts are provided in an amount between about 175 mM and about 867 mM and the one or more linkers are provided in an amount between about 85 mM and about 361 mM. In an aspect, the buffer concentration is between about 270 mM and about 1.624 M. In an aspect, the reaction solution has a reaction concentration between about 530 mM and about 2.852 M of solid reagents.

The present methods provide a mass-based, volume-normalized yield of metal-organic frameworks between about 10 and about 40 times greater than, or about 14 and about 35 times greater than, the mass-based, volume-normalized yield in the traditional synthesis.

As described herein, metal salts can be a divalent first-row transition metal salt having the formula $MX_2$ such as M=Mg, Mn; $X_2$=(Oac)$_2$, $(HCO_3)_2$, $(F_3CCO_2)_2$, (acac)$_2$, $(F_6acac)_2$, $(NO_3)_2$, $SO_4$; M=Ni, $X_2$=(Oac)$_2$, $(NO_3)_2$, $SO_4$; M=Zn, $X_2$+(Oac)$_2$, $(NO_3)_2$. In an aspect, the metal salts can be in the form of crystals or crystalline powder. In an aspect, the metal salts are $Mg(NO_3)_2 \cdot 6H_2O$ and $MnCl_2 \cdot 4H_2O$ for example.

As described herein, a metal organic framework is a porous crystalline material formed of one or more distinct metal cations, clusters, or chains Joined by two or more multitopic (polytopic) organic linkers. In an aspect, the metal-organic framework is Mg/Mn-MOF-274, sometimes referred to as MOF-274.

As described herein, suitable linkers can be formed by two phenyl rings joined at carbon 1,1', with carboxylic acids on carbons 3,3', and alcohols on carbons 4,4'. Switching the position of the carboxylic acids and the alcohols (e.g., "pc-$H_4$DOBPDC" or "pc-MOF-274") does not change the topology of the metal organic framework. In an aspect, the linker is $H_4$DOBDPC.

Solvents useful in the present methods include water, acetonitrile, and tetrahydrofuran for example. More specifically, the solvent is between about 20 and about 30 vol % water, between about 35 and about 40 vol % acetonitrile, and between about 35 and about 40 vol % tetrahydrofuran. Optionally, the solvent can be selected by evaluation of Hansen solubility parameters.

Metal organic frameworks can be synthesized at room temperature, or conventional electric heating, microwave heating, electrochemistry, mechanochemistry, and ultrasonic methods. Conventional step-by-step methods as well as high-throughput methods can be employed as well. In any synthesis, however, conditions must be established to produce defined inorganic building blocks without decomposition of an organic linker. At the same time, kinetics of crystallization must allow for nucleation and growth of the desired phase to take place.

The heating and sealing steps can include heating the reaction solution in static conditions for about 96 hours. The heating and sealing steps can include heating the reaction solution under dynamic (e.g. stirred, shaken, mixed, agitated) conditions for about 24 hours. The heating and sealing steps can include heating the reaction solution in a static oven at about 120° C. The heating and sealing steps can include heating the reaction solution in a rotating oven at about 150° C. The heating can be done without sealing, with the MOF synthesized with the solvent(s) at reflux under approximately 1 bar of pressure. In an aspect, the reaction solution is generally heated to 50° C. to 175° C. (or 100° C. to 160° C., or 115° C. to 145° C.) for 1 hour to 7 days, or 6 hours to 5 days, or 12 hours to 3 days. The reaction solution can be centrifuged or filtered to obtain the metal-organic frameworks and washed.

The present methods are advantageous as they reduce the cost and labor required in order to obtain high quality MOFs. Since the methods require less time and more material can be synthesized, they also provide more material available for testing and characterization and reduce the amount of time significantly, which can have a significant economic impact. The novel methods thus represent a process intensification of MOF synthesis.

It is integral that the quality of MOF is not sacrificed through the scale up process. Several characterization techniques, described in detail below, show that the novel methods disclosed herein produce similar or superior quality MOFs when compared to traditional synthesis.

Metals and Metal Salts

The metal organic framework comprises two or more distinct metal cations, clusters or chains joined by two or more polytopic organic linkers. In an aspect, the metal organic frameworks made by the present methods comprise one or more distinct elements independently selected from the group of Mg, Ca, V, Mn, Cr, Fe, Co, Ni, Cu and Zn. In an aspect, each of the one or more distinct elements is a metal and more particularly, is Mg, Mn, Ni, or Zn.

More specifically, the metals of the present metal organic frameworks can be one of the elements of Period 4 Groups IIA, IIIB, IVB, VB, VIB, VIIB, VIII, IB and IIB of the Periodic Table and Period 3 Group IIA including Mg, Ca, V, Mn, Cr, Fe, Co, Ni, Cu and Zn. Furthermore, the metal organic framework can comprise two more distinct elements as well as different combination of metals, theoretically represented as $M^1_xM^2_y \ldots M^n_z(A)(B)_2|x+y+ \ldots +z=2$ and $M^1 \neq M^2 \neq \ldots \neq M^n$ where x, y and z are each an independent value from 0.0 to 2.0.

The metal can be a monovalent metal that would make a protonated form of the linker. For example, the metal can be Na or one from Group I. Also, the metal can be one of two or more divalent cations ("divalent metals") or trivalent cations ("trivalent metals"). In an aspect, the metal organic framework includes metals which are at oxidation states other than +2 can (i.e., more than just divalent, trivalent tetravalent, . . . ). The framework can have metals comprising a mixture of different oxidation states. Exemplary mixtures include Fe(II) and Fe(III), Cu(II) and Cu(I) and/or Mn(II) and Mn(III). More specifically, trivalent metals are metals having a +3 oxidation state. Some metals used to form the metal organic framework, specifically Fe and Mn, can adopt+2 (divalent) or +3 (trivalent) oxidation states under relatively gentle conditions. Chem. Mater, 2017, 29, 6181. Likewise, Cu(II) can form Cu(I) under gentle conditions. As such, any minor change to the oxidation state of any of the metals and/or selective change in the oxidation state of a metal can be used to modify the present metal organic frameworks. Furthermore, any combination of different molecular fragments $C_1$, $C_2$, . . . $C_1$ may exist. Finally, all of the above variations can be combined, for example, multiple metals (two or more distinct metals) with multiple valences and multiple charge-balancing molecular fragments.

In the present methods, as described herein, the metal can be provided as divalent first-row transition metal salts $MX_2$ such as M=Mg, Mn; $X_2$=(Oac)$_2$, $(HCO_3)_2$, $(F_3CCO_2)_2$, (acac)$_2$, ($F_6$acac)$_2$, $(NO_3)_2$, MX, such as M=Mg, Mn; X=$SO_4$, $CO_3$; M=Ni, $X_2$=(Oac)$_2$, $(NO_3)_2$, $SO_4$; M=Zn, $X_2$+(Oac)$_2$, $(NO_3)_2$. Examples of metals (M) suitable for use in the metal salts include, but are not limited to, lanthanum, cerium, praseodymium, promethium, samarium, europium, gadolinium, terbium, dysprosium, holmium, erbium, thulium, ytterbium, lutetium, aluminum, gallium, indium, magnesium, calcium, strontium, barium, iron, niobium, scandium, yttrium, zirconium, titanium, vanadium, chromium, manganese, cobalt, nickel, copper, zinc, molybdenum, technetium, ruthenium, rhodium, palladium, silver, cadmium, lutetium, hafnium, tantalum, tungsten, rhenium, osmium, iridium, platinum, gold, mercury, lawrencium, rutherfordium, dubnium, seaborgium, bohrium, hassium, meitnerium, darmstadtium, roentgenium, and the like. Other sources of the metal can include metal oxides, metal hydroxides, metal sulfides, metal chalcogenides, pure metals or any combination of metal source.

Examples of the counterions in the metal salts include, but are not limited to, nitrate, nitrite, phosphate, phosphite, sulfate, sulfite, fluoride, chloride, bromide, iodide, acetate, carbonate and the like. Any of the metals may be in any of the salt forms and selected based on the ability of the metal salt (metal/counterion combination) to dissolve in the solvent. Metal salts may be hydrates, alcoholates, or acetonates.

As described herein, the metal organic frameworks are synthesized by mixing or otherwise combining metal salts and organic linkers. Suitable metal ions include metals and metalloids of varying coordination geometries and oxidation states. In an aspect, MOFs are produced using metal ions having distinctly different coordination geometries, in combination with a ligand possessing multidentate functional groups, and a suitable templating agent. One metal ion that prefers octahedral coordination is cobalt (II). One metal ion that prefers tetrahedral coordination is zinc (II). MOFs can be made using one or more of the following metal ions: $Mg^{2+}$, $Ca^{2+}$, $Sr^{2+}$, $Ba^{2+}$, $Sc^{3+}$, $Y^{3+}$, $Ti^{4}$, $Zr^{4+}$, $Hf^{4}$, $V^{5+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$>, $Os^{3+}$, $Os^{2+}$>, $Co^{3+}$, $Co^{2+}$, $Rh^{2+}$, $Rh^{+}$, $Ir^{2+}$, $Ir^{+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{+}$, $Sb^{5+}$, $Sb^{3+}$, $Sb^{+}$, and $Bi^{5+}$, $Bi^{3+}$, $Bi^{+}$, $Be^{2+}$; along with the corresponding metal salt counterion.

The term "metal ion" refers to both metal and metalloid ions. In an aspect, metal ions suitable for use in production of MOFs can include: $Sc^{3+}$, $Ti^{4+}$, $V^{4+}$, $V^{3+}$, $V^{2+}$, $Cr^{3+}$, $Mo^{3+}$, $Mg^{2+}$, $Mn^{3+}$, $Mn^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^{+}$, $Ir^{2+}$, $Ir^{+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Al^{3+}$, $Ga^{3+}$, $In^{3+}$, $Ge^{4+}$, $Ge^{2+}$, $Sn^{4+}$, $Sn^{2+}$, $Pb^{4+}$, $Pb^{2+}$, $Sb^{5+}$, $Sb^{3+}$, $Sb^{+}$, and/or $Bi^{5+}$, $Bi^{3+}$, $Bi^{+}$, $Be^{2+}$; along with the corresponding metal salt counteranion. In an aspect, metal ions for use in production of MOFs include: $Sc^{3+}$, $Ti^{4+}$, $V^{4+}$, $V^{3+}$, $Cr^{3+}$, $Mo^{3+}$, $Mn^{3+}$, $Mn^{2+}$, $Fe^{3+}$, $Fe^{2+}$, $Co^{3+}$, $Co^{2+}$, $Ni^{2+}$, $Ni^{+}$, $Cu^{2+}$, $Cu^{+}$, $Ag^{+}$, $Zn^{2+}$, $Cd^{2+}$, $Al^{3+}$, $Sn^{4+}$, $Sn^{2+}$, and/or $Bi^{5+}$, $Bi^{3+}$, $Bi^{+}$; along with the corresponding metal salt counterion. In an aspect, the metal ions for use in production of MOFs are selected from the group consisting of: $Mg^{2+}$, $Mn^{3+}$, $Mn^{2+}$, $Fe^{3+}$, $Fe^{2+}$, $Co^{3+}$, $Co^{2+}$, $Ni^{2+}$, $Ni^{+}$, $Cu^{2+}$, $Cu^{+}$, $Pt^{2+}$, $Ag^{+}$, and $Zn^{2+}$, along with the corresponding metal salt counterion.

Generally, the metal salt includes various salts of compounds prepared through neutralization of acids or bases, depending on the particular substituents found on the compound. When compounds contain relatively acidic functionalities, base addition salts can be obtained by contacting the neutral form of such compounds with a sufficient amount of the desired base, either neat or in a suitable inert solvent. Examples of base addition salts include sodium, potassium, calcium, ammonium, organic amino, or magnesium salt, or a similar salt. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids, and the like, as well as the salts derived from relatively nontoxic organic acids like acetic, propionic, isobutyric, butyric, maleic, malic, malonic, benzoic, succinic, suberic, fumaric, lactic, mandelic, phthalic, benzenesulfonic, p-tolylsulfonic, citric, tartaric, methanesulfonic, and the like. Certain compounds can contain both basic and acidic functionalities that allow the compounds to be converted into either base or acid addition salts. Hydrates of the salts are also included.

Linkers

Suitable organic linkers (also referred to herein as "linkers") can be determined from the structure of the metal organic framework and the symmetry operations that relate the portions of the organic linker that bind to the metal node of the metal organic framework. Note, a ligand is chemically and/or structurally different and allows the metal node-binding regions of the metal-organic framework to be related by a $C_2$ axis of symmetry In an aspect, linkers can include:

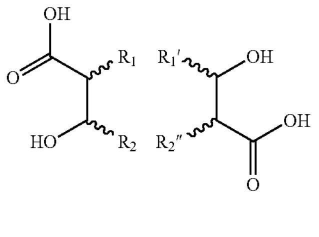

where $R_1$ is connected to $R_1$' and $R_2$ is connected to $R_2$."

Exemplary linkers include:

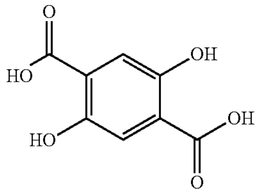

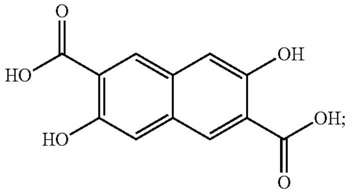

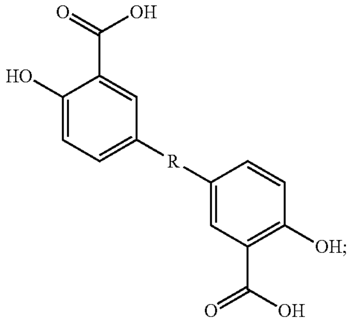

and

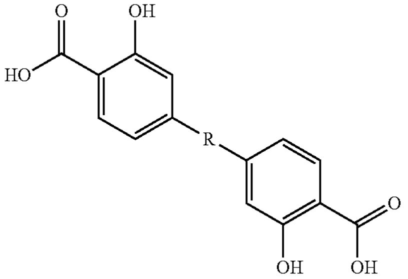

where R is any molecular fragment.

Additional examples of organic linkers include para-carboxylate ("pc-linker") such as 4,4'-dioxidobiphenyl-3,3'-dicarboxylate (DOBPDC); 4,4"-dioxido-[1,1':4',1"-terphenyl]-3,3"-dicarboxylate (DOTPDC); and dioxidobiphenyl-4,4'-dicarboxylate (para-carboxylate-DOBPDC also referred to as PC-DOBPDC) as well as the following compounds:

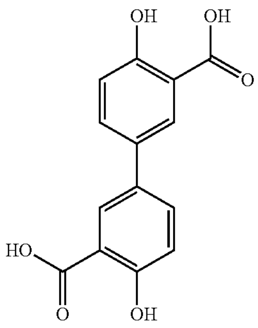

$H_4DOBPDC$

-continued

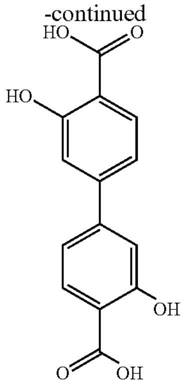

pc-$H_4DOBPDC$

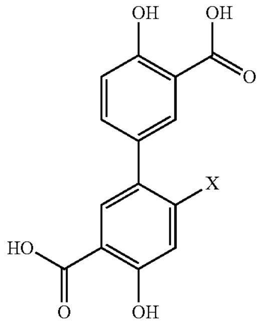

$H_4DOBPDC$-X

X = F, Cl, Br, I

In an aspect, the organic linker has the formula:

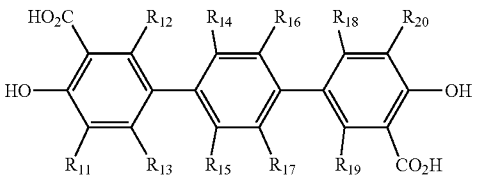

where $R_{11}$, $R_{12}$, $R_{13}$, $R_{14}$, $R_{15}$, $R_{16}$, $R_{17}$, $R_{18}$, $R_{19}$, and $R_{20}$ are each independently selected from H, halogen, hydroxyl, methyl, and halogen substituted methyl.

In an aspect, the organic linker has the formula:

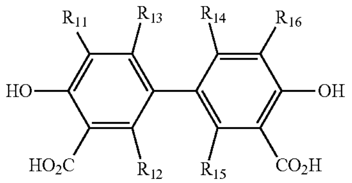

where, $R_{11}$, $R_{12}$, $R_{13}$, $R_{14}$, $R_{15}$, and $R_{16}$ are each independently selected from H, halogen, hydroxyl, methyl, and halogen substituted methyl.

In an aspect, the organic linker has the formula:

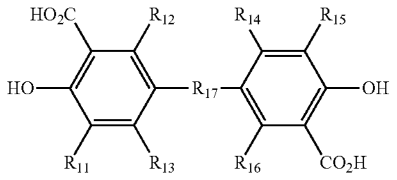

where $R_{11}$, $R_{12}$, $R_{13}$, $R_{14}$, $R_{15}$, and $R_{16}$ are each independently selected from H, halogen, hydroxyl, methyl, or halogen substituted methyl, and $R_{17}$ is selected from substituted or unsubstituted aryl, vinyl, alkynyl, and substituted or unsubstituted heteroaryl.

In an aspect, the organic linker has the formula:

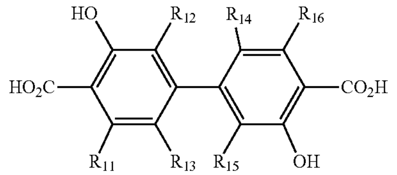

where $R_{11}$, $R_{12}$, $R_{13}$, $R_{14}$, $R_{15}$, and $R_{16}$ are each independently selected from H, halogen, hydroxyl, methyl, or halogen substituted methyl.

Where $R_{11}$, $R_{12}$, $R_{13}$, $R_{14}$, $R_{15}$, and $R_{16}$ are each independently selected from H, halogen, hydroxyl, methyl, or halogen substituted methyl, and $R_{17}$ is selected from substituted or unsubstituted aryl, vinyl, alkynyl, and substituted or unsubstituted heteroaryl.

Examples of linkers include, but are not limited to, 4,5-dicyanoimidazole, a substituted 4,5 dicyanoimidazole, oxalic acid, ethyloxalic acid, fumaric acid, 1,3,5-benzene tribenzoic acid (BTB), DCPB, benzene tribiphenylcarboxylic acid (BBC), 5,15-bis(4-carboxyphenyl) zinc (II) porphyrin (BCPP), 1,4-benzene dicarboxylic acid (BDC), 2-amino-1,4-benzene dicarboxylic acid ($R_3$—BDC or $H_2N$ BDC), 1,1'-azo-diphenyl 4,4'-dicarboxylic acid, cyclobutyl-1,4-benzene dicarboxylic acid ($R_6$—BDC), benzene tricarboxylic acid, 2,6-naphthalene dicarboxylic acid (NDC), 1,1'-biphenyl 4,4'-dicarboxylic acid (BPDC), 2,2'-bipyridyl-5,5'-dicarboxylic acid, adamantane tetracaboxylic acid (ATC), adamantane dibenzoic acid (ADB), dihydroxyterephthalic acid (DHBDC), biphenyltetracarboxylic acid (BPTC), tetrahydropyrene 2,7-dicarboxylic acid (HPDC), hihydroxyterephthalic acid (DHBC), pyrene 2,7-dicarboxylic acid (PDC), pyrazine dicarboxylic acid, acetylene dicarboxylic acid (ADC), camphor dicarboxylic acid, fumaric acid, benzene tetracarboxylic acid, 1,4-bis(4-carboxyphenyl)butadiyne, nicotinic acid, and terphenyl dicarboxylic acid (TPDC), 2,5-dihydroxy-1,4-benzene-dicarboxylic acid ($H_4$DOBDC), 4,4'-dihydroxybiphenyl-3,3'-dicarboxylic acid ($H_4$DOBPDC), 4,4"-dihydroxy-[1,1':4',1"-terphenyl]-3, 3"-dicarboxylic acid ($H_4$DOTPDC), 3,3'-dihydroxybiphenyl-4,4'-dicarboxylic acid (pc-DOBPDC) and the like, substituted derivatives of the aforementioned linkers, and the like, and any combination of the totality thereof.

The linker $H_4$DOBPDC, or 4,4'-dihydroxy-(1,1'-biphenyl)-3,3'-dicarboxylic acid, is an organic linker compound that can be synthesized as reported by Lindsey, A. S.; Jeskey, H. Chem. Rev. 1957, 57 (4), 583-620, incorporated herein by reference, or obtained commercially.

Chemical Buffers

In any of the aforementioned methods, solubility of the reagent is maximized by inclusion of a chemical buffer (referred to herein as a "buffer"), fixing nominal pH of the reaction solution to allow linker deprotonation and subsequent formation of the metal organic framework. The buffer can include an acid and its conjugate base, or a base and its conjugate acid. The buffers can be generated in situ by addition of the buffering acid followed by addition of a basic solution to the appropriate pH. Similarly, the buffers can be generated in situ by addition of the buffering base followed by addition of an acidic solution to the appropriate pH. In an aspect, the buffer can be 3-(N-morpholino)propanesulfonic acid ("MOPS") or Na MOPS.

Examples of suitable bases include, but are not limited to, piperazine, 1,4-dimethylpiperazine, sodium hydroxide, potassium hydroxide, lithium hydroxide, ammonium hydroxide and the like, and any combination thereof.

Examples of suitable acids include, but are not limited to, hydrochloric acid, nitric acid, citric acid, oxalic acid, malonic acid, succinic acid, glutaric acid, acetic acid, perchloric acid, phosphoric acid, phosphorus acid, sulfuric acid, formic acid, hydrofluoric acid, and the like, and any combination thereof.

Examples of suitable acids and conjugate bases, and suitable bases and conjugate acids which are used to buffer the nominal pH include, but are not limited to, acetic acid/acetate, citric acid/citrate, boric acid/borate, and the like, the buffers known as "Good Buffers" defined in *Biochemistry,* 1966, 5, 467-477, incorporated herein by reference, and the noncomplexing tertiary amine buffers known as "Better Buffers" defined in *Anal Chem.,* 1999, 71, 3140-3144, incorporated herein by reference.

Buffers can include potential variations on MOPS and can be of the formula:

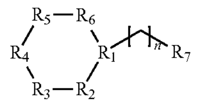

wherein n is an integer between 1 and 10, and any atoms bridging $R_1$ and $R_7$ can be functionalized with chemical substituents, or "R", where R is selected from H, substituted or unsubstituted alkyl, substituted or unsubstituted heteroalkyl, substituted or unsubstituted aryl, substituted or unsubstituted heteroaryl, and substituted or unsubstituted heterocycloalkyl groups;

$R_1$, $R_2$, $R_3$, $R_4$, $R_5$, and $R_6$ are each independently C, O, N or S; and $R_7$ is any Brønsted acid functional group or corresponding conjugate base, sulfonic acid, phosphonic acid and/or sulfoxylate, phosphonate, phosphate, hydroxyl, ammonia, or sulfate.

Solvents

Examples of solvents that can be used in the present methods, alone or in solvent mixtures, include but are not limited to, acetone, acetonitrile, benzyl alcohol, 1-butanol, 2-butanol, n-butyl acetate, cyclohexane, cyclohexanol, cyclohexanone, diacetone alcohol, 1,4-dioxane, methanol, ethanol, ethyl acetate, ethyl benzene, ethyl lactate, ethylene carbonate, ethylene glycol, ethylene glycol monobutyl ether, ethylene glycol monomethyl ether, gamma-butyrolactone (GBL), heptane, hexane, n-propanol, iso-propanol, n-butanol, iso-butanol, t-butanol, iso-propyl acetate, isophorone, d-limonene, methyl acetate, methyl ethyl ketone, N-methyl-2-pyrrolidone (NMP), methylene chloride, 1-nitropropane, n-propyl acetate, propylene carbonate, water, dimethyl sulfoxide (DMSO), tetrahydrofuran (THF), water, N,N-dimethylformamide (DMF), N,N-dimethylacetamide, 1,3-dimethylpropyleneurea, hexamethylphosphoramide, dimethyl ether, diethyl ether, methylethylether, pentane, benzene, cyclohexane, n-hexane, n-octane, kerosene, dodecane, methyl cyclohexane, toluene, and the like.

Hansen solubility parameters can be developed from the Hildebrand solubility parameter, which relates solubility to the square root of cohesive energy density. A shortcoming of defining solubility as a single parameter, as presented by Hildebrand, is that it fails to account for association between molecules, such as those arising from polarity or hydrogen-bonding interactions. In contrast, Hansen solubility parameters are predicated upon the understanding that the total energy of vaporization, and thus the total cohesive energy, has several individual parts, arising from atomic dispersion forces, dipole-dipole forces between permanent dipoles, and hydrogen bonding. Accordingly, there are three Hansen solubility parameters, each typically measured in $MPa^{0.5}$: the energy from dispersion forces between molecules (also referred to as a dispersion parameter or $\delta_D$), the energy from a dipolar intramolecular force between molecules (also referred to as a polarity parameter or $\delta_P$), and the energy from hydrogen bonds between molecules (also referred to as a hydrogen bonding parameter or $\delta_H$). Materials possessing similar Hansen solubility parameters have high affinity for each other, with the extent of similarity determining the extent of interaction. Thus, Hansen solubility parameters provide a more quantifiable means to understand the adage "like dissolves like," and is often used to predict if a first material will dissolve in a second material to form a solution. See *Hansen Solubility Parameters: A User's Handbook*, Charles M. Hansen, CRC Press, Boca Raton, FL. (2007, $2^{nd}$ ed.).

Hansen solubility parameters for certain solvents and solvent compounds (e.g., acetone, methanol, dimethyl sulfoxide (DMSO), toluene, cyclohexane, and the like) are available commercially in the HSPiP database or Hansen Solubility Parameters: A User's Handbook, Charles M. Hansen, CRC Press, Boca Raton FL. (2007, $2^{nd}$ ed.). Hansen solubility parameters can be determined experimentally for a new molecule by dispersing the molecule in a series of solvents with known Hansen solubility parameters. Upon identifying which solvents dissolve the molecule, the Hansen solubility parameters for these solvents are plotted using Cartesian coordinates by assigning each parameter to its own axis, affording a sphere of solubility in what is referred to as "Hansen space." The center of the sphere of solubility defines the empirical Hansen solubility parameters for the molecule. Further, the Hansen solubility parameters for a solvent mixture can be calculated by volume-weighted averaging of the Hansen solubility parameters for each component in the mixture. In an aspect, the solvent is selected by evaluation of Hansen solubility parameters.

By way of nonlimiting example, metal-organic frameworks can be synthesized by dissolving one or more metal salts with one or more linkers at a molar ratio of total metal salts to total linkers of 0.2:1 to 5:1 (or 0.6:1 to 3:1, or 0.8:1 to 2:1, or 1:1) in a solvent to produce a reaction solution.

As set out in the examples below, metal-organic frameworks were prepared by the traditional and novel methods described herein, and subsequently characterized.

EXAMPLE 1

Metal-organic frameworks were synthesized according to three methods traditional synthesis, high concentration synthesis, and high solids synthesis. Metal-organic frameworks were synthesized from either 1) solutions comprising increased reagent concentrations, or 2) saturated suspensions of reagents which exceed their solubility limit in the reaction solvent. In both approaches, the solubility of reagent is maximized by inclusion of a buffer, fixing the nominal pH of the solution, to allow linker deprotonation and subsequent metal-organic framework formation. Both approaches improve the yield and scale up of MOF materials. It is integral that the quality of MOF is not sacrificed through the scale up process. Several characterization techniques show that the MOF material obtained by intensification process produces same material.

Traditional Synthesis

General protocol for the synthesis of MOF-274 were from *Nature*, 2015, 519, 303-308. 27.4 mg-41.1 mg (0.1-0.15 mmol) linker $H_4DOBPDC$ was combined with 0.25-0.375 mmol metal salt and dissolved in 10 mL mixed solvent. This solution was sealed in a 20 mL scintillation vial, heated at 120 C for 12 hr, and the solids collected and washed. Yields of 23.3-54.1 mg material were obtained.

High Concentration Synthesis

To prepare Mg/Mn-MOF-274 at high concentrations of solid reagents, 0.75 mmol of $H_4DOBPDC$, 1.68 mmol of $Mg(NO_3)_2 \cdot 6H_2O$, 0.19 mmol of $MnCl_2 \cdot 4H_2O$, and 7.5 mmol of buffer Na MOPS were dissolved in 75 mL of solvent made up of 0.25. 0.37:0.38 water:acetonitrile:tetrahydrofuran. Once all solids were completely dissolved, an additional 3 mmol of $H_4DOBPDC$, 6.72 mmol of $Mg(NO_3)_2 \cdot 6H_2O$, 0.76 mmol of $MnCl_2 \cdot 4H_2O$, and 12 mmol of Na MOPS were added to the system. The reaction solution was transferred into a 125-mL Teflon-lined Parr autoclave, sealed and heated at 120° C. for 96 hrs. under static conditions. A yield of 1.08 g Mg/Mn-MOF-274 was obtained.

High Solids Synthesis

In order to obtain higher yield of Mg/Mn-MOF-274, the metal-organic frameworks were prepared under high solids conditions. Following the above method of traditional synthesis, 1.484 mmol $H_4DOBPDC$, 11.696 mmol $Mg(NO_3)_2 \cdot 6H_2O$, 1.300 mmol of $MnCl_2 \cdot 4H_2O$, and 24.4 mmol of Na MOPS buffer were mixed in 15 mL of solvent made up of 0.25:0.37:0.38 water:acetonitrile:tetrahydrofuran until all solids were well dispersed. Note, the reagents did not fully dissolve into the reaction solution. The reaction solution was transferred into a 23 mL Teflon-lined Parr autoclave which was sealed and placed in a tumbling 150° C. oven for 24 hrs. A yield of 3.6 g of Mg/Mn-MOF-274 was obtained.

A summary of the different syntheses for the traditional synthesis, high concentration synthesis, and high solids synthesis described above are provided in Table 1 below.

TABLE 1

| Synthesis Comparison | | | | | | |
|---|---|---|---|---|---|---|
| | Traditional Synthesis | | High Concentration Synthesis | | High Solids Synthesis | |
| | Quantity | Concentration | Quantity | Concentration | Quantity | Concentration |
| Linker | 0.1-0.15 mmol | 0.01M | 3.75 mmol | 0.05M | 1.05 mmol | 0.361M |
| Metal | 0.25-0.375 mmol | 0.025M | 9.35 mmol | 0.12M | 2.62 mmol | 0.866M |
| Volume | 10-15 mL | — | 75 mL | — | 15 mL | — |
| Yield | 23.3-54.1 mg | 2.3-5.4 mg/mL | 1008 mg | 13.44 mg/mL | 1200 mg | 240 mg/mL |

As displayed in Table 1, reagent concentrations were increased up to thirty-five (35) times compared to the synthesis reported in the literature, resulting in mass yields increased by up to almost 45 times when normalized by the volume of solvent used in the synthesis. The mass of the metal-organic framework MOF-274 (yield) as a function of each synthesis is shown in FIG. 1. Importantly, despite increasing the solid reagent content beyond the point where all solids are fully dissolved in the reaction solution (a saturated suspension), the quality of material is not sacrificed shown in FIGS. 2, 3 and 4.

Figure 2:
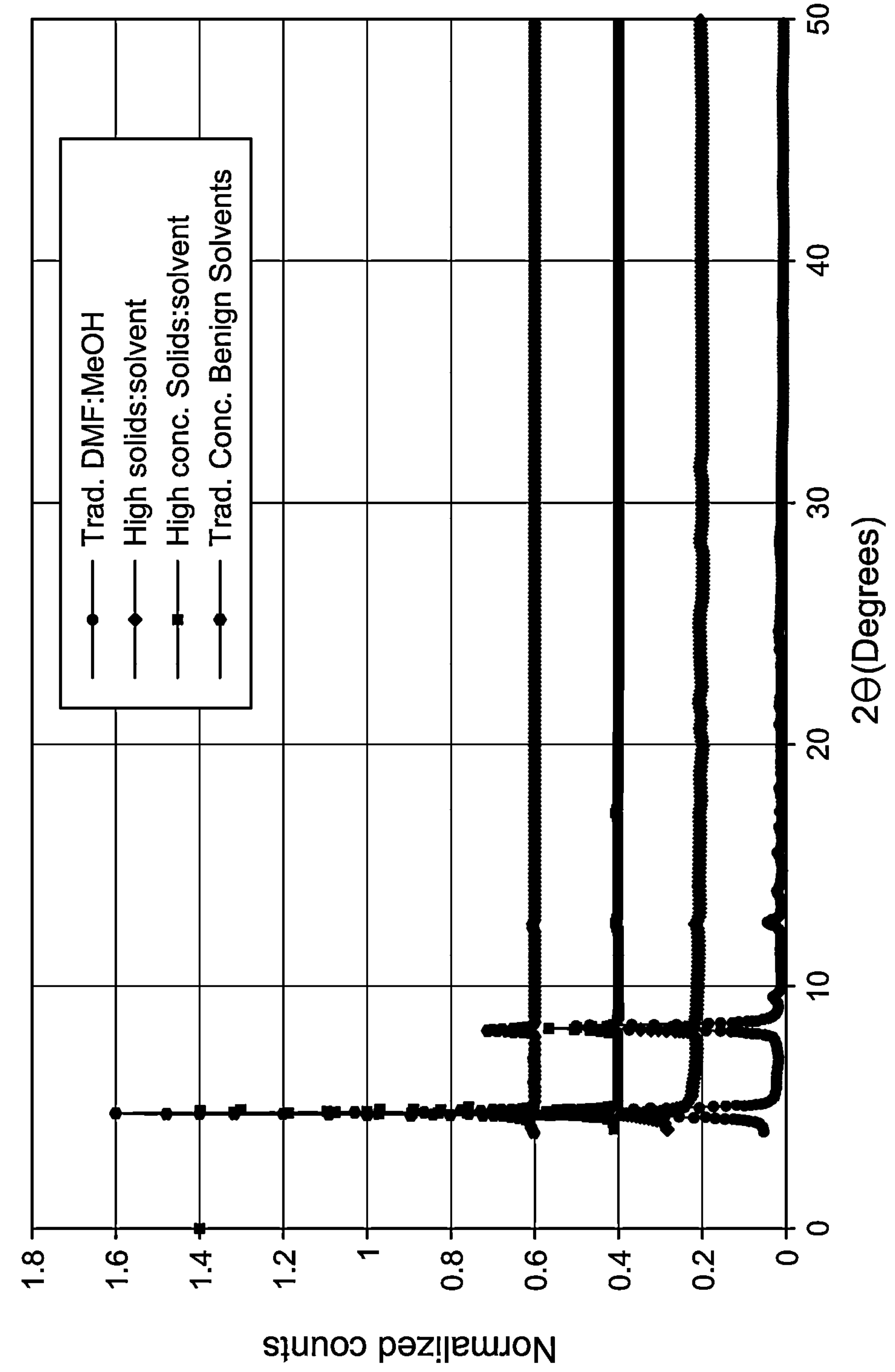
FIG. 2 shows the powder x-ray diffraction data of MOF-274 prepared using traditional synthesis, high solids synthesis and high concentration synthesis.

As shown in FIG. 2, powder x-ray diffraction pattern confirmed that same phase material was prepared using the high solids synthesis:solvent ratio versus traditional solids (made with traditional synthesis):solvent ratio (prepared by traditional solvents reported in the literature as well as benign solvents) and high concentration of solids:solvent. An amine was not appended to these metal-organic frameworks nor was the metal-organic framework functionalized or activated.

Figure 3:
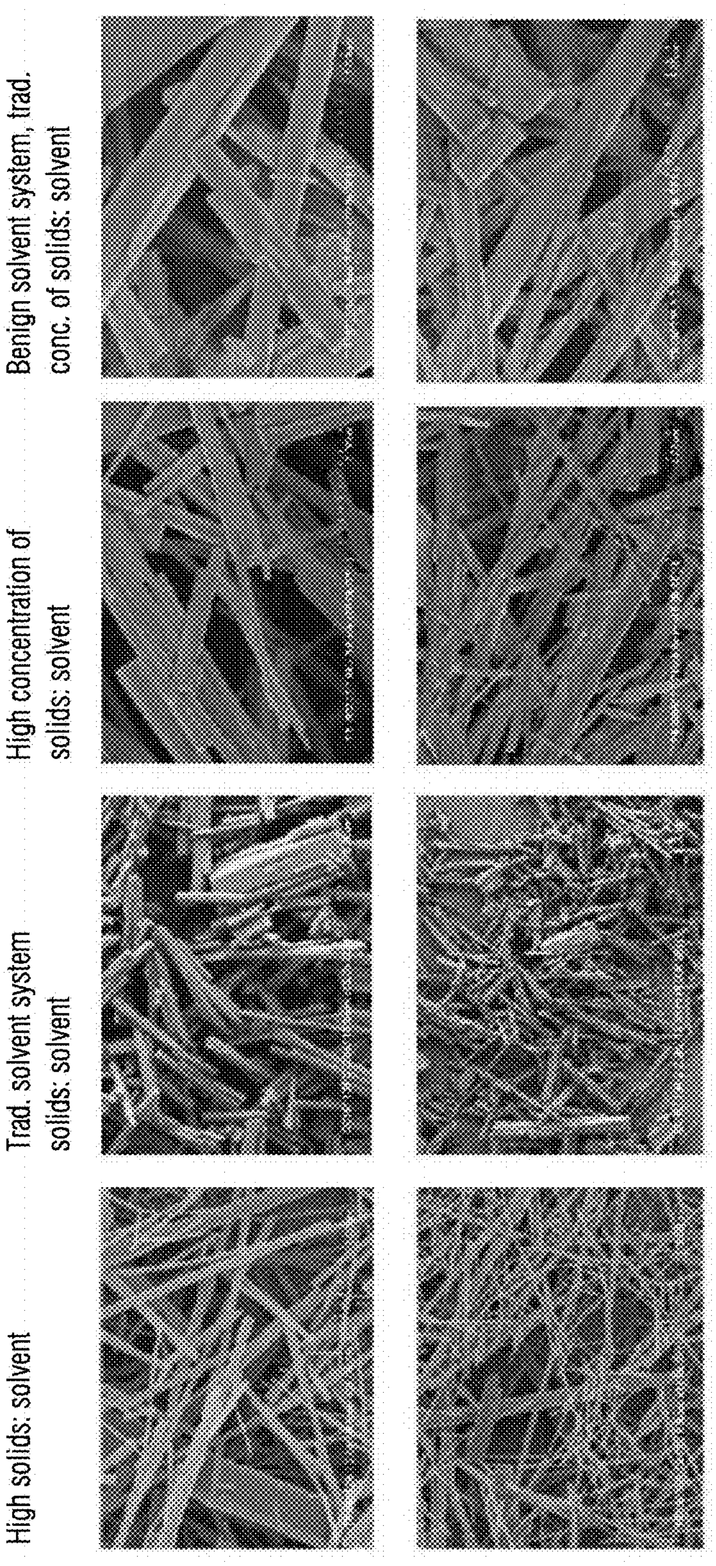
FIGS. 3A, 3B, 3C, 3D, 3E, 3F, 3G and 3H are SEM images of metal-organic framework ("MOF") material obtained from a high solids synthesis, a traditional solvothermal synthesis, high concentration of solids synthesis, and a traditional concentration of solids synthesis, respectively, showing regardless of synthesis, the MOF material has a rod-shape, typical morphology for MOF-274.

Powder x-ray diffraction ("PXRD") data further revealed comparable material crystallinity, supported by SEM images which display a persistent rod-shaped morphology accompanied by discrete crystallite formation. FIG. 3. Surface area measurements show high concentration and high solids synthesis afforded similar surface areas of the metal-organic framework when compared to the traditional synthesis. SEM images shown the bulk material shape, morphology, and a qualitative appraisal of material polydispersity. Images were collected on a Hitachi SEM at 2 keV acceleration using the upper detector.

Figure 4:
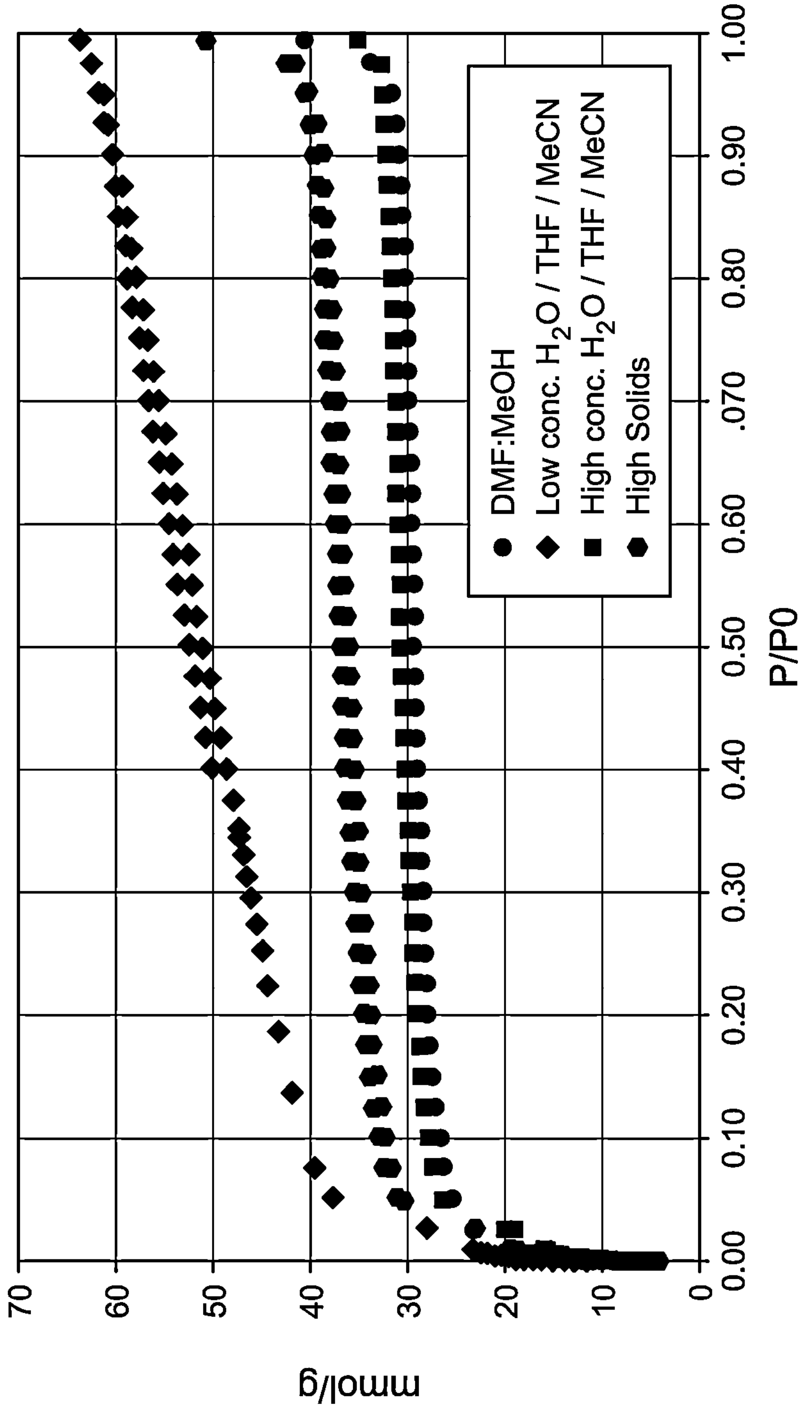
FIG. 4 is a plot in mmol per gram versus P/PO showing $N_2$ adsorption of MOF-274 synthesized under (a) traditional synthesis described by McDonald, T., Mason, J., Kong, X. et al, Cooperative insertion of $CO_2$ in diamine-appended metal-organic frameworks, Nature 519, 303-08 (2015), incorporated herein by reference, with low concentration of reagents in a solvent of DMF/MeOH; (b) a low concentration of reagents in a solvent of water/THF/MeCN; (c) a high concentration synthesis a solvent of water/THF/MeCN and (d) a high solids synthesis.

As shown in FIG. 4, $N_2$ adsorption isotherms confirmed that MOFs prepared by the high concentration synthesis and high solids synthesis had similar surface areas to the traditional synthesis. Specifically, $N_2$ adsorption of MOF-274 synthesized under literature conditions (low concentration in DMF/MeOH), in water/THF/MeCN at low concentration, in water/THF/MeCN at high concentration, and in water/THF/MeCN by the high solids synthesis Metal-organic frameworks prepared by the high concentration synthesis and the high solids synthesis exhibited an $N_2$ absorption between about 25 mmol/g and about 40 mmol/g at relative pressure between about 0.1 and about 0.9.

In summary, metal-organic frameworks were characterized to analyze the similarity to those produced by the traditional synthesis and metal-organic frameworks produced by the high concentration synthesis and high solids synthesis. Despite increasing the reagent content beyond the point where all solids are fully dissolved in the reaction solution, the quality of material is not sacrificed, as displayed in FIGS. 2-4. As shown in FIG. 2, powder x-ray diffraction data confirms that the same phase material was prepared using the high solids synthesis and high concentration synthesis compared to the traditional synthesis. Specifically, the metal-organic frameworks prepared by the high concentration synthesis and high solids synthesis exhibited powder x-ray diffraction peaks at 2θ values between about 4° and about 6° and between about 7° and about 9°, these 2θ values being similar to those of the metal-organic frameworks produced by the traditional synthesis. The powder x-ray diffraction data in FIG. 2 reveal comparable material crystallinity, further supported by the scanning electron microscope images in FIG. 3. The scanning electron microscope images in FIG. 3 show that the material obtained regardless of the synthesis method is a rod-shaped which is typical morphology for MOF-274. In FIG. 3, images in each column correspond to the same sample taken at different magnifications. As shown, metal-organic frameworks prepared by the high concentration synthesis and high solids synthesis exhibited similar crystallinity compared to metal-organic frameworks made with the traditional synthesis.

Certain features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The foregoing description of the disclosure illustrates and describes the present methodologies. Additionally, the disclosure shows and describes exemplary methods, but it is to be understood that various other combinations, modifications, and environments may be employed and the present methods are capable of changes or modifications within the scope of the concept as expressed herein, commensurate with the above teachings and/or the skill or knowledge of the relevant art.

We claim:

1. A method of making metal-organic frameworks comprising the steps of:

dissolving a first amount of a plurality of solid reagents and a buffer different from the plurality of solid reagents in a solvent to provide a synthesis solution, wherein the solid reagents comprise at least one metal salt and at least one linker; and adding a second amount of the plurality of solid reagents to the synthesis solution to produce a reaction solution having an amount of reagent concentration, the amount of reagent concentration being between about 135 mM and 400 mM, wherein the at least one metal salt is selected from the group consisting of divalent salts of Mg, Ca, V, Mn, Cr, Fe, Co, Ni, Cu, and Zn, wherein the buffer is selected from the group consisting of 3-(N-morpholino) propanesulfonic acid (MOPS), Na-MOPS, and $NaHCO_3$, wherein the solvent is selected from the group consisting of methanol, ethanol, isopropanol, n-butanol, N,N-dimethyl formamide, N,N-dimethylacetamide, tetrahydrofuran, acetonitrile, water, and combinations thereof, and the linker includes at least one para-carboxylate ("pc-linker") selected from the group consisting of 4,4'-dioxidobiphenyl-3,3'-dicarboxylate (DOBPDC), 4,4"-dioxido-[1,1':4',1"-terphenyl]-3,3"-dicarboxylate (DOTPDC), dioxidobiphenyl-4,4'-dicarboxylate (para-[1,1':4',1"-terphenyl]-3,3"-dicarboxylate (DOTPDC), dioxidobiphenyl-4,4'-dicarboxylate (para-carboxylate-DOBPDC), and the following compounds:

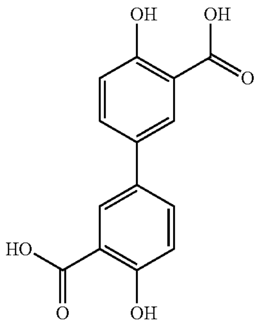

$H_4$DOBPDC

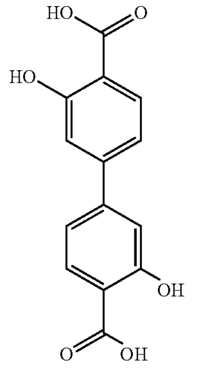

pc-$H_4$DOBPDC

-continued

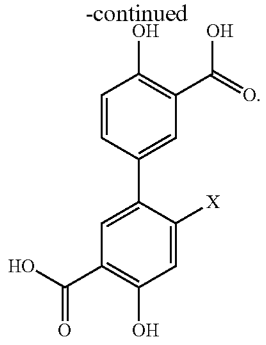

$H_4$DOBPDC-X

X = F, Cl, Br, I

2. The method of making metal-organic frameworks of claim 1, wherein the reaction solution or the reaction mixture is not static for between about 24 to about 96 hours.

3. The method of making metal-organic frameworks of claim 1, wherein the reaction solution or the reaction mixture is heated between about 100° C. and about 160° C.

4. The method of making metal-organic frameworks of claim 1, wherein the linker is $H_4$DOBDPC.

5. The method of making metal-organic frameworks of claim 1, wherein the metal salts are prepared by neutralization of acids or bases of a metal ion.

6. The method of making metal-organic frameworks of claim 1, wherein the metal comprises at least one of Mg, Mn, Ni, and Zn.

7. The method of making metal-organic frameworks of claim 1, wherein the counterions in the metal salts include nitrate, nitrite, phosphate, phosphite, sulfate, sulfite, fluoride, chloride, bromide, iodide, acetate, and/or carbonate.

8. The method of making metal-organic frameworks of claim 1, wherein the metal salts are $Mg(NO_3)_2 \cdot 6H_2O$ and $MnCl_2 \cdot 4H_2O$.

9. The method of making metal-organic frameworks of claim 1, wherein the metal-organic framework is MOF-274.

10. The method of making metal-organic frameworks of claim 1, wherein nominal pH of the reaction solution allows for linker deprotonation.

11. The method of making metal-organic frameworks of claim 1, wherein the solvent comprises water, acetonitrile, and tetrahydrofuran.

12. The method of making metal-organic frameworks of claim 1, wherein the reaction solution or the reaction mixture is heated in static, tumbling or stirred conditions.

* * * * *